(12) United States Patent
Gegner

(10) Patent No.: US 12,480,545 B2
(45) Date of Patent: Nov. 25, 2025

(54) BEARING COMPONENT HAVING A METALLIC BASE BODY AND AN ALLOY-STEEL COATING

(71) Applicant: AKTIEBOLAGET SKF, Gothenburg (SE)

(72) Inventor: Juergen Gegner, Forchheim (DE)

(73) Assignee: AKTIEBOLAGET SKF, Gothenburg (SE)

( * ) Notice: Subject to any disclaimer, the term of this patent is extended or adjusted under 35 U.S.C. 154(b) by 472 days.

(21) Appl. No.: 17/943,470

(22) Filed: Sep. 13, 2022

(65) Prior Publication Data

US 2023/0012836 A1 Jan. 19, 2023

Related U.S. Application Data

(63) Continuation of application No. 16/693,561, filed on Nov. 25, 2019, now Pat. No. 11,473,622.

(30) Foreign Application Priority Data

Nov. 27, 2018 (DE) .......................... 102018220315.6

(51) Int. Cl.
*F16C 33/62* (2006.01)
*C22C 38/00* (2006.01)
(Continued)

(52) U.S. Cl.
CPC ............ *F16C 33/62* (2013.01); *C22C 38/001* (2013.01); *C22C 38/002* (2013.01);
(Continued)

(58) Field of Classification Search
None
See application file for complete search history.

(56) References Cited

U.S. PATENT DOCUMENTS

| 3,941,903 A | 3/1976 | Tucker, Jr. |
| 4,803,045 A * | 2/1989 | Ohriner .................. C22C 38/58 420/47 |

(Continued)

FOREIGN PATENT DOCUMENTS

| CN | 101031668 A | 9/2007 |
| CN | 102066788 A | 5/2011 |

(Continued)

OTHER PUBLICATIONS

Understanding Anti-Galling Treatment for the Gas and Oil Sector.*
(Continued)

*Primary Examiner* — Jenny R Wu
(74) *Attorney, Agent, or Firm* — J-TEK LAW PLLC; Jeffrey D. Tekanic; Scott T. Wakeman

(57) ABSTRACT

A bearing component such as a bearing ring includes a metallic base body and at least one alloy steel coating on the base body, the coating being applied to the base body by deposition welding. The base body is preferably non-alloy steel or cast iron, and the alloy includes at least one carbide-forming transition metal such as niobium, tantalum, zirconium, titanium, hafnium, tungsten, molybdenum, vanadium, or manganese. The coating can form a raceway of the bearing component or a structural element such as a flange. Also a method of forming such a bearing component is provided.

19 Claims, 1 Drawing Sheet

(51) Int. Cl.

| | |
|---|---|
| *C22C 38/02* | (2006.01) |
| *C22C 38/04* | (2006.01) |
| *C22C 38/06* | (2006.01) |
| *C22C 38/10* | (2006.01) |
| *C22C 38/12* | (2006.01) |
| *C22C 38/14* | (2006.01) |
| *C22C 38/16* | (2006.01) |
| *C22C 38/18* | (2006.01) |
| *C22C 38/20* | (2006.01) |
| *C22C 38/22* | (2006.01) |
| *C22C 38/24* | (2006.01) |
| *C22C 38/26* | (2006.01) |
| *C22C 38/28* | (2006.01) |
| *C22C 38/30* | (2006.01) |
| *C22C 38/32* | (2006.01) |
| *C22C 38/40* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/50* | (2006.01) |
| *C22C 38/52* | (2006.01) |
| *C22C 38/54* | (2006.01) |
| *C22C 38/60* | (2006.01) |
| *C23C 4/067* | (2016.01) |
| *C23C 4/123* | (2016.01) |
| *C23C 4/131* | (2016.01) |
| *C23C 4/18* | (2006.01) |
| *C23C 24/10* | (2006.01) |
| *C23C 30/00* | (2006.01) |
| *F16C 33/58* | (2006.01) |

(52) U.S. Cl.
CPC ............ *C22C 38/008* (2013.01); *C22C 38/02* (2013.01); *C22C 38/04* (2013.01); *C22C 38/06* (2013.01); *C22C 38/10* (2013.01); *C22C 38/105* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/30* (2013.01); *C22C 38/32* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *C22C 38/60* (2013.01); *C23C 4/067* (2016.01); *C23C 4/123* (2016.01); *C23C 4/131* (2016.01); *C23C 4/18* (2013.01); *C23C 24/103* (2013.01); *C23C 24/106* (2013.01); *C23C 30/00* (2013.01); *C23C 30/005* (2013.01); *F16C 33/58* (2013.01); *F16C 33/583* (2013.01); *F16C 2204/20* (2013.01); *F16C 2204/60* (2013.01)

(56) References Cited

U.S. PATENT DOCUMENTS

| | | |
|---|---|---|
| 5,702,668 A | 12/1997 | Ocken et al. |
| 2004/0079448 A1 | 4/2004 | Rhoads et al. |
| 2008/0075878 A1 | 3/2008 | Perrin et al. |
| 2010/0251810 A1 | 10/2010 | Mol et al. |
| 2011/0064349 A1 | 3/2011 | Braun |
| 2014/0212082 A1* | 7/2014 | Gegner ................ F16C 33/303 |
| | | 148/570 |
| 2014/0345353 A1* | 11/2014 | Oda ...................... C22C 38/001 |
| | | 148/522 |
| 2017/0002866 A1 | 1/2017 | Krebs et al. |
| 2018/0298949 A1 | 10/2018 | Krebs et al. |
| 2019/0292621 A1 | 9/2019 | Andler |
| 2019/0366402 A1* | 12/2019 | Nozaki ................ C22C 38/56 |
| 2020/0298294 A1* | 9/2020 | Nozaki ................ C22C 38/58 |

FOREIGN PATENT DOCUMENTS

| | | | |
|---|---|---|---|
| CN | 105829741 A | | 8/2016 |
| CN | 106609349 A | | 5/2017 |
| CN | 117821974 A | * | 4/2024 |
| IN | 101918805 A | | 12/2010 |
| JP | 08109441 A | * | 4/1996 |
| JP | H08109441 A | | 4/1996 |
| JP | 2014101896 A | | 6/2014 |

OTHER PUBLICATIONS

Oshima et al., JPH 08109441 A machine translation, Apr. 30, 1996, entire translation (Year: 1996).

The World Material, DIN 1.3505 Material 100Cr6 Bearing Steel Equivalent, Composition, Properties, Hardness, Jan. 22, 2021, URL: , pp. 1-7 (Year: 2021).

Office Action from the Chinese Patent Office dated Feb. 22, 2022 in related Chinese application No. 201911165614.4, and machine translation thereof.

Search Report from the Chinese Patent Office dated Feb. 14, 2022 in related Chinese application No. 201911165614.4.

Supplementary Search Report from the Chinese Patent Office dated Aug. 24, 2022 in related Chinese application No. 201911165614.4.

* cited by examiner

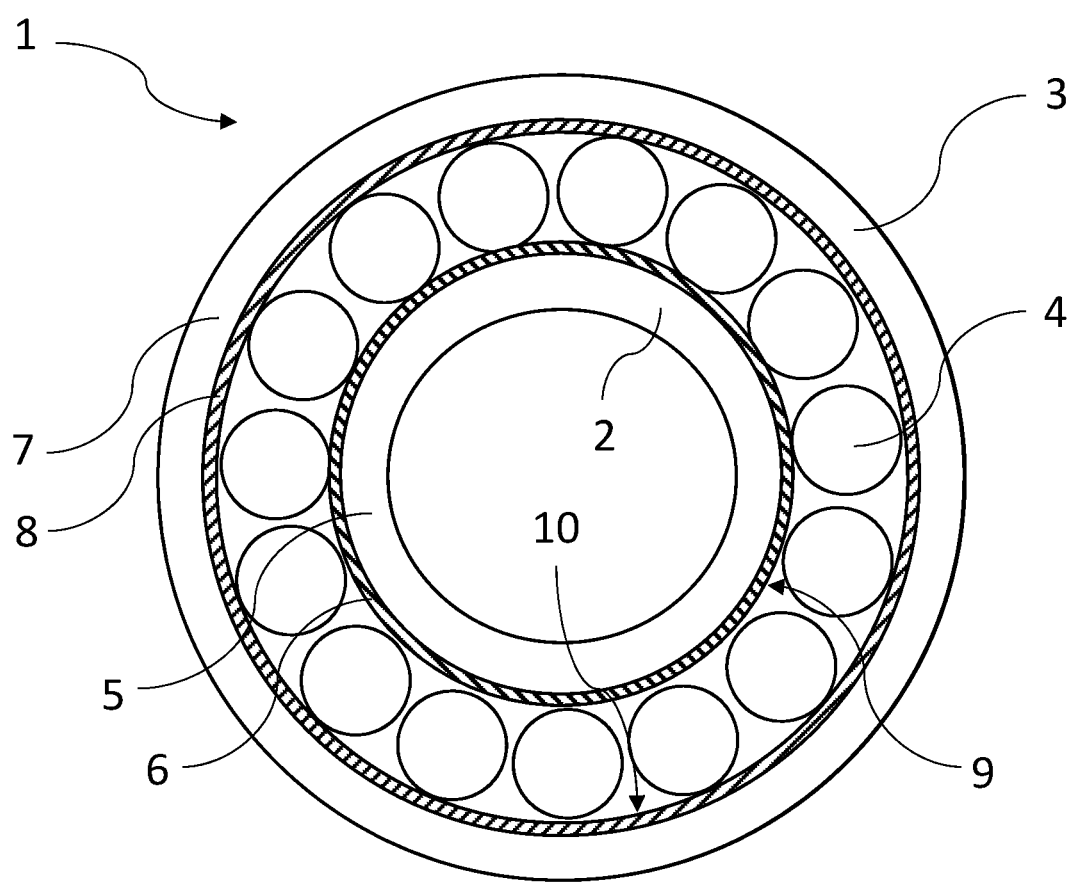

BEARING COMPONENT HAVING A METALLIC BASE BODY AND AN ALLOY-STEEL COATING

CROSS-REFERENCE

This application is a continuation of application Ser. No. 16/693,561 filed on Nov. 25, 2019, now U.S. Pat. No. 11,473,622, which claims priority to German patent application no. 10 2018 220 315.6 filed on Nov. 27, 2018, the contents of which are fully incorporated herein by reference.

TECHNOLOGICAL FIELD

The present disclosure is directed to a bearing component including a metallic base body and a coating including alloy steel.

BACKGROUND

The present disclosure is directed to a bearing component having a base body that forms the bearing component and at least one coating applied onto the base body.

A bearing component is known from the prior art, for example, a rolling-element bearing ring that has at least one raceway for rolling elements. Here the raceway should in principle have certain mechanical properties, in particular a high hardness, so that damage due to rolling-element fatigue, wear, forced rupture, or creep, etc. can be reliably avoided in a suitable manner for a period of time that is as long as possible. For this purpose it is known to coat the raceway with a coating in order to harden its surface, and, possibly, to better protect against corrosion. Here and in the following the term "surface" is used such that the surface-adjacent zone (edge layer) is comprised therein.

It is furthermore known from the prior art to harden the surface of a component comprised of steel in order to obtain a suitably hard surface for a specific application. For example, case hardening, carbonitriding, and inductive hardening are known. However, the surface hardness can only be influenced to a limited extent, thermally or thermally and chemically, by this method. In addition, such components can have properties that are undesirable at least for certain applications; for example, they may have a comparatively high brittleness of the edge layer, which can lead to the risk of crack formation.

SUMMARY

It is therefore an aspect of the present disclosure to provide a bearing component that, with the possibility of cost-effective manufacturing, is distinguished by advantageous surface properties.

In the following a bearing component is provided that includes a base body (substrate, core) manufactured from a metallic material, which base body forms the bearing component, and that includes at least one coating (plating, cladding, deposition layer) applied (attached, clad, fused, deposited) onto the base body. The bearing component can be, for example, an inner ring or outer ring of a rotating rolling-element bearing, a raceway of a linear bearing or of a plain bearing, a flange, a cage, a seal, or a rolling element. The bearing component can be newly manufactured according to the disclosure, or remanufactured (in the latter case optionally with improved performance) for further use (after a certain operating period), for example, after a thorough cleaning and mechanically ablating functional-surface preparation.

The base body can be manufactured from a cost-effective metal.

According to one preferred embodiment, the base body is made of non-alloyed steel, for example, non-alloyed structural steel (e.g., S185, S235, S275, S295, S355; different variants/material numbers are respectively possible: e.g. S275JR/1.0044, S275JO/1.0143) or non-alloy heat treatable steel (e.g., C22/1.1151, C35/1.1181, C40/1.1186, C45/1.1191, C50/1.1206), or from cast iron (e.g. nodular iron, GJS, or austenitic-ferritic or ausferritic cast iron with spheroidal graphite or with carbides, ADI or CADI, also austempered or bainitic cast iron); the latter materials are relatively cost-effective. However, the base body can also be manufactured from a different metallic material, for example, a through, case or induction hardenable, stainless or heat-resistant rolling-element-bearing steel such as the standard rolling-element-bearing steel 100Cr6 (material number (EN): 1.3505) or carburized or non-carburized case hardening bearing steel 18NiCrMo14-6 (material number (EN): 1.3533), a low-alloyed heat treatable steel, such as 42CrMo4 (material number (EN): 1.7225) or a different metallic alloy, such as, for example, from an aluminum, copper, or titanium material. The selection of the material allows, for example, a setting (modification) of the properties of the base body (e.g., quenching and tempering of a low-alloyed heat treatable steel), which properties are favorably adapted to the requirements of the particular application of the present disclosure. S235 has a composition (in wt. %) of C: ≤0.22, Mn: ≤1.60, P: ≤0.05, S: ≤0.05, Si: ≤0.05, N: ≤0.009, the remainder being iron and unavoidable impurities. S355 has a composition (in wt. %) of C: ≤0.23, Mn: ≤1.60, P: ≤0.05, S: ≤0.05, Si: ≤0.05, N: ≤0.009, the remainder being iron and unavoidable impurities. C22/1.1151 has a composition (in wt. %) of C: 0.17-0.24, Si: ≤0.4, Mn: 0.4-0.7, Ni: ≤0.4, P: ≤0.03, S: ≤0.035, Cr: ≤0.4, Mo: ≤0.1, the remainder being iron and unavoidable impurities. C35/1.1181 has a composition (in wt. %) of C: 0.32-0.39, Si: ≤0.4, Mn: 0.5-0.8, Ni: ≤0.4, P: ≤0.03, S: ≤0.035, Cr: ≤0.4, Mo: ≤0.1, the remainder being iron and unavoidable impurities. Thus, the base body may generally have a composition (in wt. %) of C: ≤0.4, Mn: ≤1.60, Ni: ≤0.4, P: ≤0.05, S: ≤0.05, Si: ≤0.4, Cr: ≤0.4, Mo: ≤0.1, N: ≤0.009, the remainder being iron and unavoidable impurities.

In general, non-alloyed steel or cast iron or also aluminum, copper, or titanium alloys are not suitable for manufacturing a bearing component because these materials do not have the required surface properties (e.g., hardness, fatigue life, wear resistance). However, since bearing components according to the present application have a coating that provides a more robust surface having greater, more suitable hardness and strength, the materials mentioned above can be used for forming the base body according to the present teachings.

In particular a comparatively less-hard material can thus be used for the base body in applications in which a non-throughgoing mechanical load (e.g., rolling) is expected to stress the interior regions less strongly than the surface (edge layer), e.g., in a bearing ring or a rolling element of a bearing.

In order to achieve a high hardness for the surface of the coating, the coating is composed of an alloy steel and is applied onto the base body by deposition welding (also known as cladding). The coating is thus suitable, for example, for forming the raceway surfaces of a rotating or linear rolling-element bearing or of the raceways of a plain bearing.

Furthermore, deposition welding has the advantage that an alloy formation can be effected "in situ" in the liquid phase during the welding process or in the coating applied onto the base body. In this way the possibility arises, for example, to also "directly" add, to the steel applied as coating, such chemical elements whose admixture would be technologically difficult in conventional melt-metallurgy (volume-) manufacturing processes.

According to one preferred exemplary embodiment the alloy steel of the coating includes an alloy made of a base steel and at least one carbide-forming transition metal. By using the carbide-forming transition metal, the coating can be made to include (form) (special) carbides, carbonitrides, and/or nitrides; here the deposition welding can ensure that the carbides, carbonitrides, and/or nitrides are contained in the coating in a particularly high proportion. Using conventional methods, corresponding proportions cannot be achieved or can only be achieved with great technical effort.

The carbides, carbonitrides, or nitrides are present in the alloy of the coating in particular in the form of small particles that are uniformly distributed with high density. The particles can be formed in particular by a deformation-induced dynamic precipitation reaction, after the deposition welding process, with a subsequent reshaping treatment (e.g., rolling, pressing, forging) at an elevated temperature (relative to room temperature), with (e.g., thermomechanical treatment) or without temporal controlling or regulating of the temperature, and a suitably adjusted degree of deformation of the coating. Here a desirably small particle size of less than 1 μm can be achieved due to the deformation-induced precipitation of dislocation cores from (high) supersaturation of the dissolved transition metal atoms (precipitation potential) in the solid solution.

Alternatively the particles in the coating can also be (purely) thermally (e.g., isothermally, in a plurality of temperature stages, or temperature-controlled as desired) precipitated by a heat treatment subsequent to the deposition welding.

Reshaping and heat treatment can also be carried out in any combination for precipitation of the particles.

Furthermore, for example, initially, a solution annealing can be effected at a high temperature (e.g., over 1100 or 1200° C.) in order to, for example, dissolve in the matrix the larger particles formed during the solidification for the later precipitation of the desired small particles. It can thus be achieved that the particles are comparatively small and their number is comparatively large, so that subsequently the particles overall—with a given total volume of particles—have a particularly large surface area. In addition to the additional strength increase associated therewith (small particle distance, principle of precipitation or dispersion hardening), this is in particular thus of significance since the carbide, carbonitride, or nitride particles function as microstructurally irreversible adhesion sites for strong internal binding of hydrogen, which is harmful to the material properties of the steel and diffusing in the lattice. In general, hydrogen can become incorporated in a metallic microstructure, wherein in particular the mobile (diffusible) and weakly (e.g., at dislocations) bound hydrogen impairs the mechanical behavior and, for example, reduces the toughness; in steels, it is known as hydrogen embrittlement. As a consequence thereof, there is a risk of a hydrogen-induced crack formation, and accelerated material fatigue can result. The risk of a hydrogen-induced crack formation (hydrogen-induced cracking, HIC) and a hydrogen-induced material fatigue can be reduced in particular by embedding the above-mentioned particles in the alloy of the coating.

In principle the greater the particle density, the better. However, in order to avoid negative effects on the material properties the volume proportion of the particles should not exceed approximately 10%.

According to one preferred exemplary embodiment the at least one transition metal is niobium, tantalum, zirconium, titanium, hafnium, tungsten, molybdenum, vanadium, and/or manganese. Here the choice of the carbide-forming transition metal(s) serving as the alloying element(s) hardly influences the trapping or absorption capacity of the resulting precipitation particles for hydrogen, but significantly influences the technological manufacturability, the design, and properties of the target structure in the steel of the coating. To reduce the above-mentioned effect of the binding of hydrogen atoms (as well as to increase strength), it is particularly advantageous to form particles that are as small as possible and are as evenly distributed as possible. Niobium, tantalum, and zirconium are therefore particularly preferred as the carbide-forming transition metal(s), since these elements, owing to a relatively high precipitation potential, i.e., high speed of nucleation (often referred to as nucleation rate), for deformation-induced precipitation of carbides, carbonitrides, and/or nitrides, and simultaneously owing to relatively slow precipitation kinetics, lead to denser precipitation particles being finely distributed in the structure during a reshaping (forming) at an elevated temperature, compared to titanium and vanadium, which are less suitable in this respect. This desired precipitation behavior during the reshaping process at an elevated temperature can be demonstrated qualitatively in that numerous grains, which are uniformly distributed at the dislocations in the microstructure, form quickly (high nucleation speed), but then subsequently grow only slightly (low grain growth speed).

Zirconium has the further advantage of tending to precipitate small incoherent particles that are particularly favorable for hydrogen adhesion ("trapping"), as well as for increasing strength, and in addition also scarcely coarsen due to the slow diffusion of zirconium in the steel matrix in the event of an optional subsequent heat treatment (e.g. martensitic or bainitic hardening of the coating).

According to one preferred exemplary embodiment the mass proportion of the carbide-forming transition metal in the alloy is between 0.01% and 5%, particularly preferably between 1% and 3%, since in this way—in comparison to conventional bearing components—a particularly high proportion of the transition metal can be achieved, which can be introduced into the alloy during the in situ welding process.

According to one preferred exemplary embodiment, the base steel of the alloy is an overrolling-resistant steel, in particular a through-hardening rolling-element-bearing steel, for example, 100Cr6 or a derivative thereof, such as, for example, 100CrMnSi6-4 (material number (EN): 1.3520), 100CrMo7-3 (EN 1.3536) or 100CrMnMoSi8-4-6 (EN 1.3539). These steel grades are characterized by high hardness (typically between 58 and 65 HRC, depending on the heat treatment, over the entire cross-section or in the edge layer), high rolling contact fatigue resistance, and good wear resistance, such as is known as such for rolling-element bearings. 100Cr6 has a composition (in wt. %) of C: 0.93-1.05, Si: 0.15-0.35, Mn: 0.25-0.45, P: ≤0.025, S: ≤0.015, Cr: 1.35-1.60, Al: ≤0.050, Cu: ≤0.30, the remainder being iron and unavoidable impurities. 100CrMnSi6-4 has a composition (in wt. %) of C: 0.93-1.05, Si: 0.45-0.75, Mn:

1.0-1.20, P: ≤0.025, S: ≤0.015, Cr: 1.40-1.65, Al: ≤0.050, Cu: ≤0.30, the remainder being iron and unavoidable impurities. 100CrMo7-3 has a composition (in wt. %) of C: 0.93-1.05, Si: 0.25-0.35, Mn: 0.60-0.80, P: ≤0.025, S: ≤0.015, Cr: 1.65-1.95, Mo: 0.20-0.35, Al: ≤0.050, Cu: ≤0.30, the remainder being iron and unavoidable impurities. 100CrMnMoSi8-4-6 has a composition (in wt. %) of C: 0.93-1.05, Si: 0.40-0.60, Mn: 0.80-1.10, P: ≤0.025, S: ≤0.015, Cr: 1.80-2.05, Mo: 0.50-0.60, Al: ≤0.050, Cu: ≤0.30, the remainder being iron and unavoidable impurities. Thus, the coating (cladding) may have a composition (in wt. %) of C: 0.93-1.05, Si: 0.15-0.75, Mn: 0.25-1.20, P: ≤0.025, S: ≤0.015, Cr: 1.35-2.05, Mo: ≤0.060, Al: ≤0.050, Cu: ≤0.30, and a total of 0.5-5 (wt. %), more preferably 1-3 (wt. %), of one or more of Nb, Ta, and/or Zr, the remainder being iron and unavoidable impurities.

If the base body is manufactured from a rolling-element-bearing steel such as, for example, the standard rolling-element bearing steel 100Cr6, the base steel of the alloy can advantageously be, for example, a higher-grade (e.g., fatigue-resistant) rolling-element bearing steel, for example, 100CrMo7-3.

According to a further preferred exemplary embodiment, the alloy of the coating (cladding) is composed of rolling-element-bearing steel 100Cr6 as the base steel, and between 1.5 and 2.5 wt. % zirconium, preferably 1.8-2.2 wt. % zirconium, more preferably 2 wt. % zirconium, as the transition metal, or between 0.5 and 1.5 wt. % niobium, preferably 0.8-1.2 wt. % niobium, more preferably 1 wt. % niobium, as the transition metal, or between 2.5 and 3.5 wt. % tantalum, preferably 2.8-3.2 wt. % tantalum, more preferably 3 wt. % tantalum, as the transition metal. Due to their ability to form carbide, carbonitride, or nitride particles that are precipitable in a deformation-induced manner in a fine distribution according to the methods described herein, these three mentioned alloys are particularly well suited as the raceway material of an inner or outer bearing ring.

According to a further exemplary embodiment, a preferred composition of the base steel of the coating comprises, in weight percent:
  0.25 to 1.3 carbon,
  0.1 to 1.0 silicon,
  0.1 to 1.5 manganese,
  0.5 to 2.5 chromium,
  and optionally one or more of the following elements:
  0 to 1.0 molybdenum,
  0 to 4.0 nickel,
  0 to 0.5 copper,
  0 to 0.1 aluminum,
  0 to 0.1 calcium,
  0 to 0.1 vanadium,
  0 to 0.1 titanium,
  0 to 0.1 niobium,
  0 to 0.1 tantalum,
  0 to 0.1 tungsten,
  0 to 0.1 cobalt,
  0 to 0.1 nitrogen,
  0 to 0.1 oxygen,
  0 to 0.1 boron,
  0 to 0.05 phosphorus,
  0 to 0.05 sulfur, and
  0 to 0.05 tin
  the remainder being iron and unavoidable contaminants (impurities), such as, for example, arsenic, lead, antimony, magnesium.

The mass proportions are indicated herein in weight percent (wt. %) in the technically-common way. Mass percent is also used with the same meaning.

According to one exemplary embodiment a bearing component is provided in the form of a bearing ring, for example, an inner ring of a cylindrical roller bearing, wherein the coating forms a raceway for rolling elements to roll on. A long service life for the bearing ring can be achieved according to such an embodiment.

According to one exemplary embodiment the coating also forms a structure, for example, in the form of a guide flange or retaining flange, or a contour of the raceway. Such a structure can be manufactured in a particularly suitable manner by deposition welding.

According to one exemplary embodiment the base body is manufactured in its final form (completely dimensioned) prior to application of the coating/cladding. In such an embodiment, the base body (core) already has its final shape for the raceway, etc. The coating can then be applied onto one or more regions of the base body, such as one of the region(s) that will form the raceway(s) for the bearing.

According to a further aspect of the disclosure a method is provided for manufacturing a bearing component, including the following steps: a) providing a metallic base body and b) applying at least one metallic coating onto the base body by deposition welding, wherein the coating includes an alloy steel containing at least one carbide-forming transition metal.

The deposition welding thus serves here as a method of additive manufacturing (additive welding), and may optionally also be used for reprocessing (refinishing, refurbishing, remanufacturing), for example, of a used large bearing ring. Since the coating is applied onto the base body by deposition welding, the alloy can be formed "in situ" during the welding (cladding) process. Thus in a single manufacturing step, the alloy of the coating can be formed and applied onto the base body.

Here the base body is preferably manufactured from non-alloy steel or cast iron or an aluminum, titanium, or copper alloy. In some embodiments, the base body is formed from non-alloy steel or cast iron.

For example, a plasma arc welding (plasma arc cladding), a laser (beam) welding (laser cladding), or an electron beam welding (electron beam cladding) can be used for the deposition welding.

According to one preferred exemplary embodiment, the alloy steel of the coating includes an alloy made of a base steel and at least one carbide-forming transition metal. In particular for forming the coating, the components of the alloy that comprise the base steel and the at least one transition metal may be first mixed in order to form a deposition material (filler material) that is then applied to the base body to form the coating by the above-mentioned deposition welding (cladding) process.

Here the component(s) of the transition metal(s) can be provided in pure form, a mixture, an alloy, and/or a chemical compound, for example, an intermetallic phase (e.g., with iron or at least one further transition metal), having a comparatively low melting point.

According to one exemplary embodiment, the mixing of the components of the coating material can be effected before the deposition welding or during the process of the deposition welding. Mixing during the welding process is particularly advantageous since in this way a separate mixing process can be omitted. A corresponding nozzle assembly, for example, can be used for the mixing.

The components are preferably provided in the form of a powder and/or of a wire and/or of a band. Particularly preferably powders can be used that are commonly available for the widest variety of materials. The mixing for forming the alloy is thereby particularly simple, in particular when it is effected during the welding. The component that forms the base steel of the coating can thus be, for example, a powder made of 100Cr6. The component that forms the zirconium can in particular be highly pure zirconium powder.

During the application of the coating according to one preferred exemplary embodiment, an alloy of the base steel is formed with the transition metal that has dissolved as a liquid in the melt or as solid in the substitutional solid solution (e.g., of the austenite). During a reshaping treatment (e.g., pressing and/or rolling) at an elevated temperature, carbides, carbonitrides and/or nitrides of the transition metal are subsequently generated by deformation-induced dynamic precipitation. Here this thermally-mechanically controlled structure formation is effected in combination with at least one hot, warm, or lukewarm reshaping of the workpiece, wherein the increased temperature during the reshaping can be set by a single (common method) or multiple heating, or in a temperature controlled manner by a controlled or regulated heating. In this way the particles can be formed in a suitably high number and with a uniform distribution in the coating.

Here due to such a reshaping not only can the desired particles be generated in a suitable amount, size, and density in the coating, but in particular a property optimization can also be effected, for example in the form of a grain refining for increasing the strength. A closing of pores or cavities that might possibly be present in the coating after the deposition welding can also thus be achieved, for example.

The above-mentioned reshaping processes are each carried out at constant temperature or at varying, preferably decreasing temperatures (e.g., after heating) between approximately 1400° C., preferably 1250° C., and 500° C. In order to achieve a particularly efficient deformation-induced dynamic precipitation of the particles, the reshaping (e.g., ring rolling) can be carried out at an elevated temperature over a longer time, in particular longer than with usual hot/warm/lukewarm reshaping, for example, over one or more minutes. Here, for example, in a two-stage reshaping process the duration of the first (hot) reshaping at elevated temperatures between approximately 1250 and 950° C. (e.g., ring rolling in the range of approximately 1100° C.) can fall significantly below the duration of the second (warm) reshaping (e.g., again ring rolling) between 900 and 600° C. Furthermore, at least one heat treatment (thermomechanical treatment) can be upstream from, between, or downstream from the at least one reshaping process, wherein furthermore preferably in the or in each reshaping process or after the last reshaping process a controlled cooling, for example, a quenching, occurs in order to further increase the hardness of the coating.

As mentioned above, it is advantageous if the corresponding particles are present in the coating in the largest possible number with a uniform distribution, and have a smallest possible size. During deposition welding of the described alloy and subsequent reshaping treatment at elevated temperature, carbides, carbonitrides or nitrides are formed that are smaller than 1 µm or smaller than 0.5 µm, or even smaller than 0.1 µm or smaller than 0.05 µm.

In addition, by using the methods described herein, slag losses (e.g., of an oxide-type) can be more easily avoided than in a conventional melt-metallurgical steel manufacturing process in which carbides, carbonitrides or nitrides precipitate during a heat treatment.

According to a further exemplary embodiment the desired particles, which are the carbides, carbonitrides, and/or nitrides of the transition metal, are generated by thermal precipitation in a single- or multi-step heat treatment subsequent to the deposition welding. This heat-treatment process may be carried out, e.g., at a constant temperature, in a plurality of isothermal steps or at any varying temperatures, preferably with peak temperatures respectively between approximately 500 and 1250° C.

According to a further exemplary embodiment at least one reshaping treatment and at least one heat treatment are combined with one another in any sequence in order to generate the desired particles in the coating by precipitation processes. According to a further exemplary embodiment a brief solution annealing takes place beforehand at a temperature between 1000 and 1250° C. in order to thus dissolve in the matrix the larger particles formed during the solidification for the later precipitation of the desired small particles.

According to a further exemplary embodiment a closing further step also takes place after the above-mentioned steps, in order, for example, to form in the coating a martensitic or bainitic microstructure having desired mechanical properties (e.g., hardness). Here the sizes and the distribution of the precipitated particles no longer change significantly.

Furthermore the bearing component can also have at least one further coating, which is applied onto the first-mentioned coating using a further deposition welding (cladding). In principle a plurality of corresponding coatings (multilayer coatings) can be provided one-over-the-other. Here the further coating is applied in particular onto the first-mentioned coating in a similar manner, i.e., again by a corresponding deposition welding.

Finally a final other coating, which can serve, for example, to improve the tribological properties, to increase the corrosion resistance, and/or to inhibit the conduction of electric current can be applied onto the coating generated by the deposition welding in one layer or in a plurality of layers. Black oxidation, PVD (physical vapor deposition), CVD (chemical vapor deposition), or plasma spraying (e.g., non-conductive aluminum oxide) can be mentioned here as examples.

Further advantages and advantageous embodiments are specified in the description, the drawings, and the claims. Here in particular the combinations of features specified in the description and in the drawings are purely exemplary, so that the features can also be present individually or combined in other ways.

In the following the disclosure shall be described in more detail using exemplary embodiments depicted in the drawing. Here the exemplary embodiments and the combinations shown in the exemplary embodiments are purely exemplary and are not intended to define the scope of the invention. This scope is defined solely by the pending claims.

BRIEF DESCRIPTION OF THE DRAWING

FIG. 1 is a schematic cross-sectional view of a rolling-element bearing according to the present disclosure.

DETAILED DESCRIPTION

In the following, identical or functionally equivalent elements are designated by the same reference numbers.

In FIG. 1 a rolling-element bearing 1 is illustrated that includes a bearing inner ring 2 having a raceway 9 and a bearing outer ring 3 having a raceway 10. Rolling elements 4 are disposed therebetween that roll on the raceways 9, 10.

The bearing inner ring 2 includes a base body (core) 5 that forms the bearing inner ring 2 and a metallic coating (cladding) 6 applied onto the base body 5, which metallic coating 6 forms the raceway for the rolling elements 4. Here the coating 6 is applied onto the base body 5 by deposition welding (cladding, e.g., laser cladding).

The base body 5 optionally may be manufactured from a non-alloy steel, for example, S235, S355, C22, or C35. In such embodiments of the present teachings, the base body 5 can be manufactured relatively cost-effectively due to the selection of a less expensive material for the core. The coating 6 itself includes an alloy steel, which enables the required hardness and rolling contact fatigue resistance to be achieved for the raceway 9.

According to one preferred exemplary embodiment the alloy of the coating 6 comprises the through-hardened rolling-element-bearing steel 100Cr6 as the base steel, and the transition metal zirconium in a concentration of 2.0 wt. % as a further component. This comparatively high proportion of the transition metal zirconium can be made possible in the alloy since the coating 6 is applied onto the base body 5 by the deposition welding process, wherein the alloy is formed "in situ" in the welding process. It is noted, for purposes of comparison, that such a high proportion of the transition metal can be achieved using known steel manufacturing techniques only with considerable technical effort.

The bearing outer ring 3 also may be formed in an analogous manner; in particular, the bearing outer ring 3 may include a base body 7 and a coating 8 that is applied in a similar manner onto the raceway of the bearing outer ring 3.

In summary a bearing component is provided that includes a base body and a coating, wherein the coating is distinguished by exhibiting a particularly high hardness and rolling wear resistance. Here the coating is formed on the base body "in situ" during a deposition welding process. In comparison to conventional melt-metallurgical steel manufacturing, with subsequent precipitation of carbides, carbonitrides, or nitrides, e.g., in the context of a heat treatment, using the inventive method, slag losses in particular can be more easily avoided during steel manufacturing.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing components having metallic base bodies and an alloy-steel coating.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Rolling-element bearing
2 Bearing inner ring
3 Bearing outer ring
4 Rolling element
5 Base body of the bearing inner ring
6 Coating of the bearing inner ring
7 Base body of the bearing outer ring
8 Coating of the bearing outer ring
9 Raceway of the bearing inner ring
10 Raceway of the bearing outer ring

What is claimed is:

1. A bearing including:
an outer ring having an outer ring raceway;
an inner ring disposed within the outer ring and having an inner ring raceway facing the outer ring raceway, the inner and outer ring raceways being movable relative to each other;
wherein at least one of the outer ring and the inner ring has:
a metallic base body, and
at least one steel alloy cladding fused to the base body and defining at least one of the outer ring raceway and the inner ring raceway, and
wherein the at least one steel alloy cladding comprises an alloy of a base steel, 0-0.1 wt. % vanadium, and at least one carbide-forming transition metal selected from the group consisting of 0.5-1.5 wt % niobium, 2.5-3.5 wt % tantalum, and 1.5-2.5 wt % zirconium; and
wherein the at least one steel alloy cladding further comprises one or more additional elements selected from the group consisting of:
0.1 to 1.0 wt % silicon,
0.1 to 1.5 wt % manganese, and
0.5 to 2.5 wt % chromium.

2. The bearing according to claim 1, wherein the base body comprises a material selected from the group consisting of: non-alloy steel, cast iron, an aluminum alloy, a titanium alloy and a copper alloy.

3. The bearing according to claim 1, wherein the base body comprises non-alloy steel or cast iron.

4. The bearing according to claim 1,
wherein the at least one steel alloy cladding includes a rolling-element-bearing steel as the base steel, and
wherein the carbide-forming transition metal includes
a) 2 wt. % zirconium, or
b) 1 wt. % niobium, or
c) 3 wt. % tantalum.

5. The bearing according to claim 4, wherein the rolling-element-bearing steel is selected from the group consisting of 100Cr6, 100CrMnSi6-4, 100CrMo7-3 and 100CrMnMoSi84-6.

6. The bearing according to claim 1, wherein the base steel includes:

0.25 to 1.3 wt % carbon,
0.1 to 1.0 wt % silicon,
0.1 to 1.5 wt % manganese, and
0.5 to 2.5 wt % chromium.

7. The bearing according to claim 6, wherein the base steel includes one or more of the following elements:
0 to 1.0 wt % molybdenum,
0 to 4.0 wt % nickel,
0 to 0.5 wt % copper,
0 to 0.1 wt % aluminum,
0 to 0.1 wt % calcium,
0 to 0.1 wt % titanium,
0 to 0.1 wt % niobium,
0 to 0.1 wt % tantalum,
0 to 0.1 wt % tungsten,
0 to 0.1 wt % cobalt,
0 to 0.1 wt % nitrogen,
0 to 0.1 wt % oxygen,
0 to 0.1 wt % boron,
0 to 0.05 wt % phosphorus,
0 to 0.05 wt % sulfur, and
0 to 0.05 wt % tin,
the remainder being iron and unavoidable impurities.

8. The bearing according to claim 6, wherein the base body comprises a material selected from the group consisting of: non-alloy steel, cast iron, an aluminum alloy, a titanium alloy and a copper alloy.

9. The bearing according to claim 6, wherein the base body comprises non-alloy steel or cast iron.

10. The bearing according to claim 9, further comprising:
a plurality of rolling elements disposed between the outer ring and the inner ring and contacting both the outer ring raceway and the inner ring raceway,
wherein the bearing is a rotating linear rolling-element bearing or a linear rolling-element bearing.

11. The bearing according to claim 1, wherein both the outer ring and the inner ring have:
the metallic base body, and
the at least one steel alloy cladding fused to the base body to respectively define the outer ring raceway and the inner ring raceway.

12. The bearing according to claim 1, further comprising a plurality of rolling elements disposed between the outer ring and the inner ring and contacting both the outer ring raceway and the inner ring raceway.

13. The bearing according to claim 12, wherein the bearing is a rotating linear rolling-element bearing or a linear rolling-element bearing.

14. The bearing according to claim 1, wherein the bearing is a plain bearing and the outer ring raceway is slidable against the inner ring raceway.

15. The bearing according to claim 1, wherein the at least one steel alloy cladding contains 0.8-1.2 wt % carbon.

16. A bearing ring comprising:
a core composed of non-alloy steel that comprises up to 0.4 wt % carbon; and
a cladding fused to a raceway surface of the core, the cladding being composed of a steel that comprises 0.8-1.2 wt % carbon, 0 to 0.1 wt. % vanadium and 1-3 wt. % of at least one carbide-forming transition metal selected from the group consisting of niobium, tantalum, and zirconium;
wherein the steel of the cladding further comprises one or more additional elements selected from the group consisting of:
0.1 to 1.0 wt % silicon,
0.1 to 1.5 wt % manganese, and
0.5 to 2.5 wt % chromium.

17. The bearing ring according to claim 16, wherein the steel of the cladding includes:
0.1 to 1.0 wt % silicon,
0.1 to 1.5 wt % manganese, and
0.5 to 2.5 wt % chromium.

18. A bearing ring comprising:
a core composed of non-alloy steel that comprises up to 0.4 wt % carbon; and
a cladding fused to a raceway surface of the core, the cladding being composed of a steel that comprises 0.8-1.2 wt % carbon, 0-0.1 wt. % vanadium and at least one carbide-forming transition metal selected from the group consisting of 2.5-3.5 wt % tantalum and 1.5-2.5 wt % zirconium.

19. The bearing ring according to claim 18, wherein the steel of the cladding further comprises one or more elements selected from the group consisting of:
0.1 to 1.0 wt % silicon,
0.1 to 1.5 wt % manganese, and
0.5 to 2.5 wt % chromium.

* * * * *